(12) United States Patent
Loughmiller et al.

(10) Patent No.: US 7,257,564 B2
(45) Date of Patent: Aug. 14, 2007

(54) DYNAMIC MESSAGE FILTERING

(75) Inventors: Scott Loughmiller, Mountain View, CA (US); Mike Olson, Sunnyvale, CA (US); Jeff Ready, San Jose, CA (US); Ehren Maedge, Los Altos, CA (US); Phil White, Santa Clara, CA (US); Jason Collier, San Jose, CA (US)

(73) Assignee: Tumbleweed Communications Corp., Redwood City, CA (US)

( * ) Notice: Subject to any disclaimer, the term of this patent is extended or adjusted under 35 U.S.C. 154(b) by 369 days.

(21) Appl. No.: 10/678,602

(22) Filed: Oct. 3, 2003

(65) Prior Publication Data

US 2005/0076084 A1    Apr. 7, 2005

(51) Int. Cl.
*G06N 3/02* (2006.01)

(52) U.S. Cl. .............................. 706/16; 706/10; 706/14; 709/202; 709/206; 714/1; 714/4; 714/100

(58) Field of Classification Search ............ 706/10–16, 706/18, 20, 909; 709/202, 206, 207; 726/1, 726/2; 714/1, 4, 26, 100, 699
See application file for complete search history.

(56) References Cited

U.S. PATENT DOCUMENTS

| | | | | |
|---|---|---|---|---|
| 6,161,130 | A * | 12/2000 | Horvitz et al. | 709/206 |
| 6,321,267 | B1 * | 11/2001 | Donaldson | 709/229 |
| 6,393,465 | B2 * | 5/2002 | Leeds | 709/207 |
| 6,769,016 | B2 * | 7/2004 | Rothwell et al. | 709/206 |
| 2001/0032245 | A1 | 10/2001 | Fodor | |
| 2002/0035605 | A1 | 3/2002 | McDowell et al. | |
| 2002/0038296 | A1 | 3/2002 | Margolus et al. | |
| 2002/0105545 | A1 | 8/2002 | Carter et al. | |
| 2003/0009698 | A1 | 1/2003 | Lindeman et al. | |

OTHER PUBLICATIONS

Graham, Paul, A Plan for Spam, Aug. 2002.
Graham, Paul, Better Bayesian Filtering, Jan. 2003.
Zhou, Feng; Zhuang, Li; Zhao Ben Y; Hunag, Ling, Joseph, Anthony D. and Kubiatowiz, John, Approximate Object Location and Spam Filtering on Peer-to-peer System, Proc. Of ACM/IFIP/USENIX Intl. Middleware Conf (Middleware 2003) ( printed May 16, 2003).
Carreras, Xavier and Marquez, Lluis, Boosting Trees for Anti-Spam Email Filtering, TALP Research Center, LSI Department, Universitat Politecnica de Catalunya, Barcelona, Spain (undated, printed May 16, 2003).
Yerazunis, William S., Spare Binary Polynomial Hashing and the CRM114 Discriminator, Mitsubishi Electric Research Laboratories, Version Jan. 20, 2003, Cambridge, MA.

(Continued)

*Primary Examiner*—David Vincent
*Assistant Examiner*—Omar F. Fernandez Rivas
(74) *Attorney, Agent, or Firm*—Skadden, Arps, Slate, Meagher & Flom, LLP.

(57) ABSTRACT

Dynamically filtering and classifying messages, as good messages, bulk periodicals, or spam. A regular expression recognizer, and pre-trained neural networks. The neural networks distinguish "likely good" from "likely spam," and also operate at a more discriminating level to distinguish among the three categories above. A dynamic whitelist and blacklist; sending addresses are collected when the number of their messages indicates the sender is good or a spammer. A dynamically selected set of regular expressions input to the neural networks.

8 Claims, 5 Drawing Sheets

OTHER PUBLICATIONS

How the Spam Filter Works, Edward Technologies, Inc., Ft. Lauderdale, Florida, 2002 (printed May 16, 2003).

Buchmann, Jeremy, Using a Gentic Algorythm to Select Features for Span Filtering, Dec. 13, 2002.

GFI launches freeware version of Exchange Server anti-span product, Mar. 5, 2003, London, United Kingdom.

Sahami, Mehran; Dumais, Susan; Heckerman, David; Horvitz, Eric, A Bayesian Approach to Filtering Junk E-Mail, Computer Science Department, Stanford University, Stanford, CA (printed May 16, 2003).

Androutsopolous, Ion; Koutsias, John; Chandrinos, Konstantionos V.; Paliouras George and Spyropolous, Constantine D., An Evaluation of Naive Bayesian Anti-Span Filtering, Software and Knowledge Engineering Laboratory, National Centre for Scientific Research "Demokritos," Athens, Greece (printed May 16, 2003).

Androutsopoulous, Ion; Paliouras, Georgios; Karkaletsis, Vangelis; Sakkis, Georgios; Spyropoulos, Constantine D; Stamatopoulos, Panagiotis, Learning to Filter Spam E-mail: A comparison of a Naive Bayesian and a Memory-Based Approach, Department of Informatics, National Centre for Scientific Research "Demokritos," University of Athens, Greece (printed May 16, 2003).

Sakkis, Georgios; Androutsopoulous, Ion; Paliouras, Georgios; Karkaletsis, Vangelis; Spyropoulos, Constantine D; Stamatopoulos, Panagiotis, A Memory-Based Approach to Anti-Spam Filtering, National Centre for Scientific Research "Demokritos," Technical Report DEMO 2001, Athens, Greece (printed May 16, 2003).

Urbas, Eytan, White Paper Analysis: Mailshell SpamCatcher Accuracy vs. Error, Aug. 2002.

Using Natural Language Processing to Filter Spam, printed May 16, 2003.

Kolathur, Satheesh and Subramanian, Subha, Collaborative Spam Filter, Sep. 27, 2000.

378 Semester Project Spam Filtering Using Neural Networks, printed May 16, 2003.

Spamassassin—Mail Filter to Identify Spam Using Text Analysis, printed May 16, 2003.

Boyer, Bob and Kerney, William, Spamfilter v1.0; printed May 16, 2003.

Drewes, Rich, An Artificial Neural Network Spam Classifier, May 8, 2002.

Build a Cool Spam Filter Using Outlook Express, printed May 16, 2003.

Joachims, Thorsten, Transductive Inference for Text Classification using Support Vector Machines, Universität Dortmund, Germany, printed May 16, 2003.

Burton, Brian, SpamProbe—Bayesian Spam Filtering Tweaks, printed May 16, 2003.

Statistical Spam Filter Works for Me, Now with updating "whitelist," printed May 16, 2003.

Metzger, Jörg; Schillo, Michael and Fischer, Klaus, A Multiagent-based Peer-to-Peer Network in Java for Distributed Spam Filtering, German Research Center for Artificial Inteligence, Saarbrücken, Germany, printed May 16, 2003.

* cited by examiner

DYNAMIC MESSAGE FILTERING

BACKGROUND OF THE INVENTION

1. Field of the Invention

The invention relates to dynamic message filtering, such as for example filtering incoming messages in response to their content; in one embodiment, messages can be delivered, or other action taken, in response to a result of dynamic filtering.

2. Related Art

In computer communication networks, it is common to send and receive messages among users, such as for the purpose of correspondence, distributing information, and responding to requests. One method for doing so is electronic mail, also known as email. One problem that has arisen in the art is that some messages are unwanted. Moreover, it has become common for advertisers and other message senders to collect relatively large numbers of email addresses, and to send unsolicited advertising in bulk to recipients at those email addresses. When the number of such unsolicited bulk email messages is relatively large, it can take substantial time and effort for recipients to delete them. There is also the possibility that the recipient will miss a relatively important message due to the relatively large number of unimportant messages accumulated in their email inbox. Such unsolicited bulk email messages are often known by the colloquial term "spam," and senders of such messages are often known as "spammers."

A first known method for detecting spam includes so-called "whitelists" and "blacklists," in which the sender of each message is identified by the filter as known to be "good" (a sender who is not a spammer), or "bad" (a sender who is known to be a spammer). While these methods generally achieve the goal of filtering messages, they are subject to the drawback that the user is involved in managing the whitelist or blacklist, and the further drawback that spammers often choose new, unique, sending addresses from which to send new spam.

A second known method for detecting spam includes attempting to evaluate from the content of the message whether it is spam or not. Known evaluation techniques include (a) searching the message for known keywords that are typically indicative of spam, such as words identifying known products popularly promoted by spammers, and (b) evaluating the message by comparing the number of such "bad" keywords with probable "good" keywords, such as words relatively unlikely to be used in a spam message. One example of the latter method is the Bayesian filter proposed by Paul Graham, "A Plan for Spam," and performed by some implementations of the "Mozilla" email client. While these methods generally achieve the goal of filtering messages, they are subject to the drawback that the user must train the implementation to recognize the "bad" keywords and "good" keywords particular to the type of message that user typically receives, and the further drawback that spammers often choose, new, unique, products to promote or words (often misspellings) with which to identify them.

Accordingly, it would be advantageous to provide an improved technique for dynamic message filtering.

SUMMARY OF THE INVENTION

The invention provides a method and system capable of dynamically filtering incoming messages, with the effect of classifying those messages into one of at least three categories: good messages, bulk periodicals, and spam. The intermediate category of "bulk periodicals" is reserved for messages that are clearly not directed to the individual recipient, but which the recipient might wish to review anyway, such as for example information relating to updates of products the user is already using, or information relating to products or services the user is explicitly interested in.

In a first aspect, the system includes an identification engine that classifies messages based on a measured intent of each message. In one embodiment, the engine includes a regular expression recognizer and a set of artificial neural networks pretrained to classify messages. The regular expression recognizer is suitable for detecting misspelled words, likely spam phrases composed of otherwise innocent words (such as for example "MAKE MONEY FAST"), and other common attempts by spammers to evade detection by known keywords that are typically indicative of spam. The artificial neural networks divide messages into "likely good" and "likely spam," and with that information, operate at a more detailed and discriminating level to distinguish among good messages, bulk periodicals, and spam. Messages initially considered "likely good" might be ultimately identified as good messages or as bulk periodicals. Similarly, messages initially considered "likely spam" might be ultimately identified as bulk periodicals or as spam. This aspect accounts for the fuzziness in determination, and reduces the number of messages erroneously identified as spam by identifying a significant number of them as bulk periodicals, which are considered relatively less pernicious by the user.

In a second aspect, the system includes a dynamic whitelist and blacklist, into which sending addresses are collected when the number of messages from those sending addresses indicates that the sender is likely good or likely a spammer. In one embodiment, any sender for whom at least a threshold number (preferably four) of messages pass as good messages is automatically added to the whitelist of known good senders, so that messages from those senders need not be checked as thoroughly as from other senders.

In a third aspect, the system includes a set of regular expressions whose detection is input to the artificial neural networks, in one embodiment selected before installation, with the effects that the artificial neural networks can be trained more rapidly, and respond more rapidly and accurately to changes in the typical email received by the user. In one embodiment, a subset of the 2,000 most useful regular expressions (identifying words or phrases) is selected using a genetic algorithm, out of the possibly 70,000 most common English words and phrases that might be used. This also has the effect that the artificial neural networks can be made smaller (that is, with fewer input nodes and fewer hidden nodes), and are capable of being executed directly in relatively less main memory, with the effect that such execution is relatively faster.

The invention is not restricted to email messages, but is also applicable to other types of messages or data, such as for example web pages or web page caching, "pop-up" advertising, and web page JavaScript, "instant messages," message protocols using HTTP tunneling, as well as to other types of filtering, such as for example automatic routing of email to appropriate recipients, automatic prioritization for review (or for forwarding to a pager or wireless email inbox), automatic collection of groups of messages into message digests, automatic flagging of messages for secondary review or for legal liability, and automatic detecting of outgoing messages for virus content.

DETAILED DESCRIPTION OF THE PREFERRED EMBODIMENT

In the description herein, a preferred embodiment of the invention is described, including preferred process steps and data structures. Those skilled in the art would realize, after perusal of this application, that embodiments of the invention might be implemented using a variety of other techniques not specifically described, without undue experimentation or further invention, and that such other techniques would be within the scope and spirit of the invention.

Lexicography

The general meaning of each of these following terms is intended to be illustrative and in no way limiting.

The terms "email," "message" and the phrases "electronic mail" and "electronic message" generally describe any technique by which information is carried (or attempted to be carried) from a sender to a recipient, whether that technique is asynchronous or synchronous, circuit switched or packet switched, human readable or not, intended for individual recipients or not, or broadcast or multicast or unicast or not. As used herein, the term "message" is intentionally broad. As described herein, there is no particular requirement that messages must be pure or primarily text.

The phrases "unwanted email," "unwanted messages" and the term "spam" generally describe any message not specifically desired by, or offensive to, or wasting the time of, its actual or potential recipient. As used herein, the term "spam" is intentionally broad, even though it might be typically applied to messages that are unsolicited, sent in bulk, and often involve advertising.

The phrase "bulk periodicals" generally describes, when applied to messages, messages that are clearly not directed to the individual recipient, but which the recipient might wish to review anyway, such as for example information relating to updates of products the user is already using, or information relating to products or services the user is explicitly interested in.

The phrase "relatively important message" generally describes any message not considered "spam," and not considered a desirable bulk message, such as for example a periodical or an advertisement of interest to the recipient. This has the effect that the invention provides a method and system capable of dynamically filtering incoming messages, with the effect of classifying those messages into one of at least three categories: good messages, bulk periodicals, and spam. The former are relatively important messages, the latter are relatively unwanted messages, and the middle (bulk periodicals) are messages that might or might not be desirable to the user.

The terms "blocking" and "filtering," when applied to messages, generally describe any technique by which those messages are marked for action on the part of a user, such as for example to tag them with an evaluation of whether the message is spam, to take action in response to that evaluation, or to order or otherwise prioritize those messages in response to that evaluation. For example, not intended to be limiting in any way, "taking action" in response to that evaluation might include forwarding part or all of a message to a wireless recipient, copying the message to a more permanent log, redistributing the message to another user, or reporting the sender of the message to an anti-spam enforcer (such as for example the spammer's ISP, a common blacklist of spammer sending addresses, or a government agency).

The phrase "false positives", when applied to messages, generally describe any messages misidentified as not being relatively important messages, when in fact they are.

Other and further applications of the invention, including extensions of these terms and concepts, would be clear to those of ordinary skill in the art after purchasing this application. These other and further applications are part of the scope and spirit of the invention, and would be clear to those of ordinary skill in the art without further invention or undue experimentation.

The scope and spirit of the invention is not limited to any of these definitions, or to specific examples mentioned therein, but is intended to include the most general concepts embodied by these and other terms.

Generalized System Elements

Figure 1:
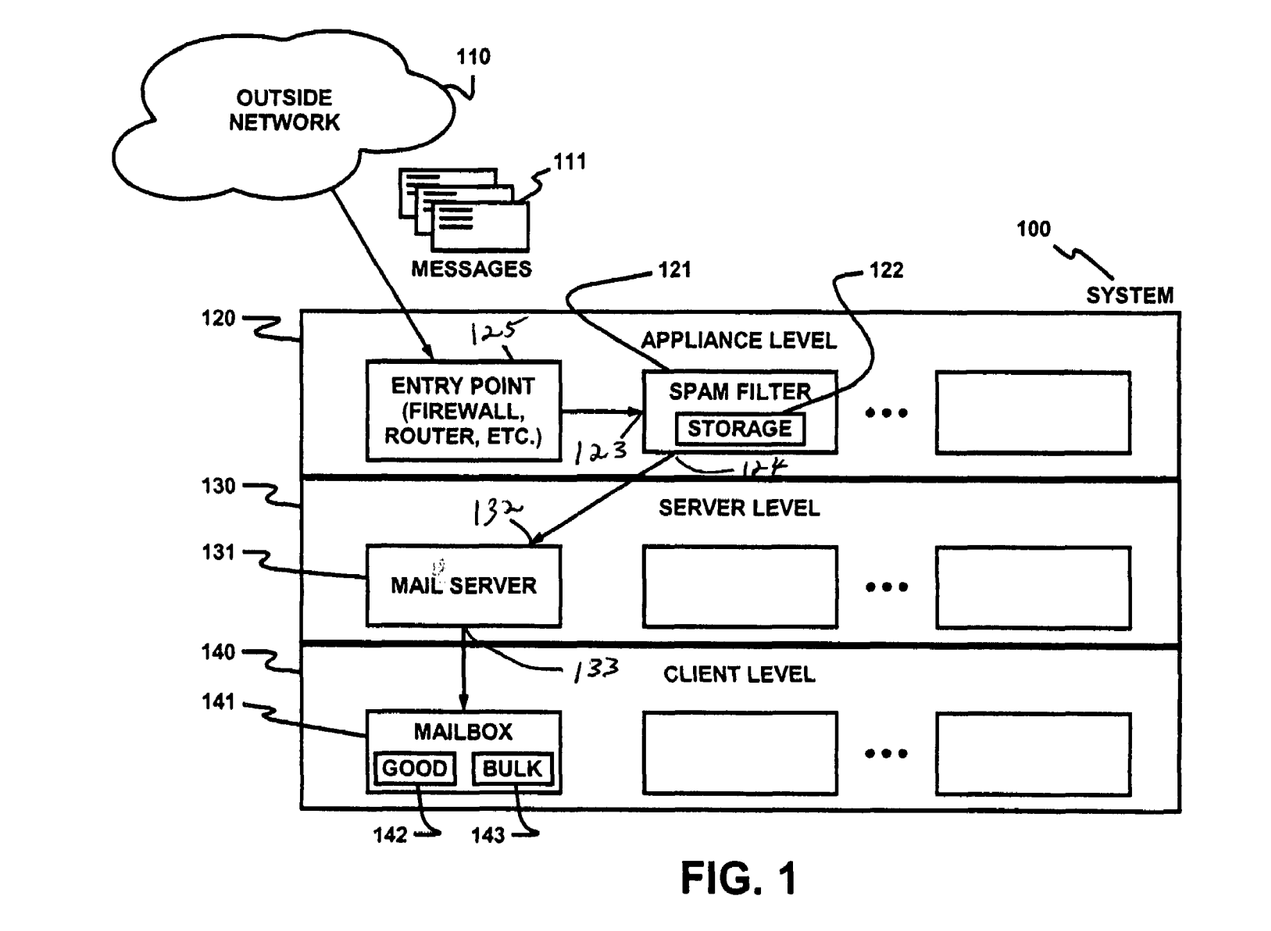
FIG. 1 shows a block diagram of a generalized system for dynamic message filtering.

FIG. 1 shows a block diagram of a generalized system for dynamic message filtering.

In a generalized conception of an embodiment of the invention, a system 100 is coupled to an outside network 110, and includes an appliance level 120, a server level 130, and a client level 140.

The outside network 110 might include any technique for sending or receiving messages, including incoming mail traffic 111 such as email and other messages. In one embodiment, the outside network 110 includes an Internet, such as for example an ISP coupled to an Internet backbone network. However, in the context of the invention, there is no particular requirement that the outside network 110 involves any particular type of communication system. In alternative embodiments, the outside network 110 may include an intranet, extranet, VPN, an ATM network, a private or public switched network such as for example a PSTN, or some combination or conjunction thereof.

In one embodiment, the appliance level 120 includes an entry point 125 to an enterprise network, possibly involving a firewall, a router or gateway router, or a software construct such as a VPN (virtual private network) disposed within a more inclusive communication network. The appliance level 120 includes a spam filter 121 coupled to the entry point to the enterprise network, and also coupled to the rest of the enterprise network. For one example, not intended to be limiting in any way, the spam filter 121 might be coupled to the firewall at a first port 123, and coupled to the enterprise network (such as a network including a LAN, WAN, VLAN, VPN, or the like) at a second port 124. In one embodiment, the spam filter 121 includes at least some storage 122, such as for example a database or other storage, at which the spam filter 121 might maintain any junk mail (spam) blocked, retained, or withheld by the spam filter 121.

In one embodiment, the server level 130 includes a set of server elements. For example, not intended to be limiting in any way, the server level 130 might include at least one of: a mail server, a web server, a database server, a server for network-attached storage, or a print server. In one embodiment, the server level 130 includes at least one mail server 131, which is coupled to the spam filter 121 at a first port 132, and coupled to the client level 140 at a second port 133. For example, not intended to be limiting in any way, the mail server 131 might be coupled to a set of workstations at which users receive and manipulate email messages.

In one embodiment, the client level 140 includes a set of client devices. For example, not intended to be limiting in any way, the client level 140 might include a set of workstations, printers, wireless communication devices, or handheld devices such as for example "Blackberry" or "Palm Pilot" devices or PDA's (personal digital assistants) or personal organizers. In one embodiment, the client level 140 includes at least one recipient mailbox 141. The recipient mailbox 141 includes at least two regions, a "good messages" mailbox section 142 and a "bulk periodicals" mailbox section 143.

As described below, the spam filter 121 receives at least some of the incoming mail traffic 111 from the outside network 110, and classifies messages from that incoming mail traffic 111 into a set of classes. In one embodiment, this set of classes includes "good messages," "bulk periodicals," and "junk email." The spam filter 121 retains those messages classified as junk email at the appliance level 120 in storage 122, while allowing those messages classified as good messages or bulk periodicals, suitably marked, to be forwarded to the server level 130. At the server level 130, the mail server 131 receives the good messages or bulk periodicals, suitably marked, delivers the good messages to the "good messages" mailbox section 142, and delivers the bulk periodicals to the "bulk periodicals" mailbox section 143.

System Elements (Behind a Firewall)

Figure 2:
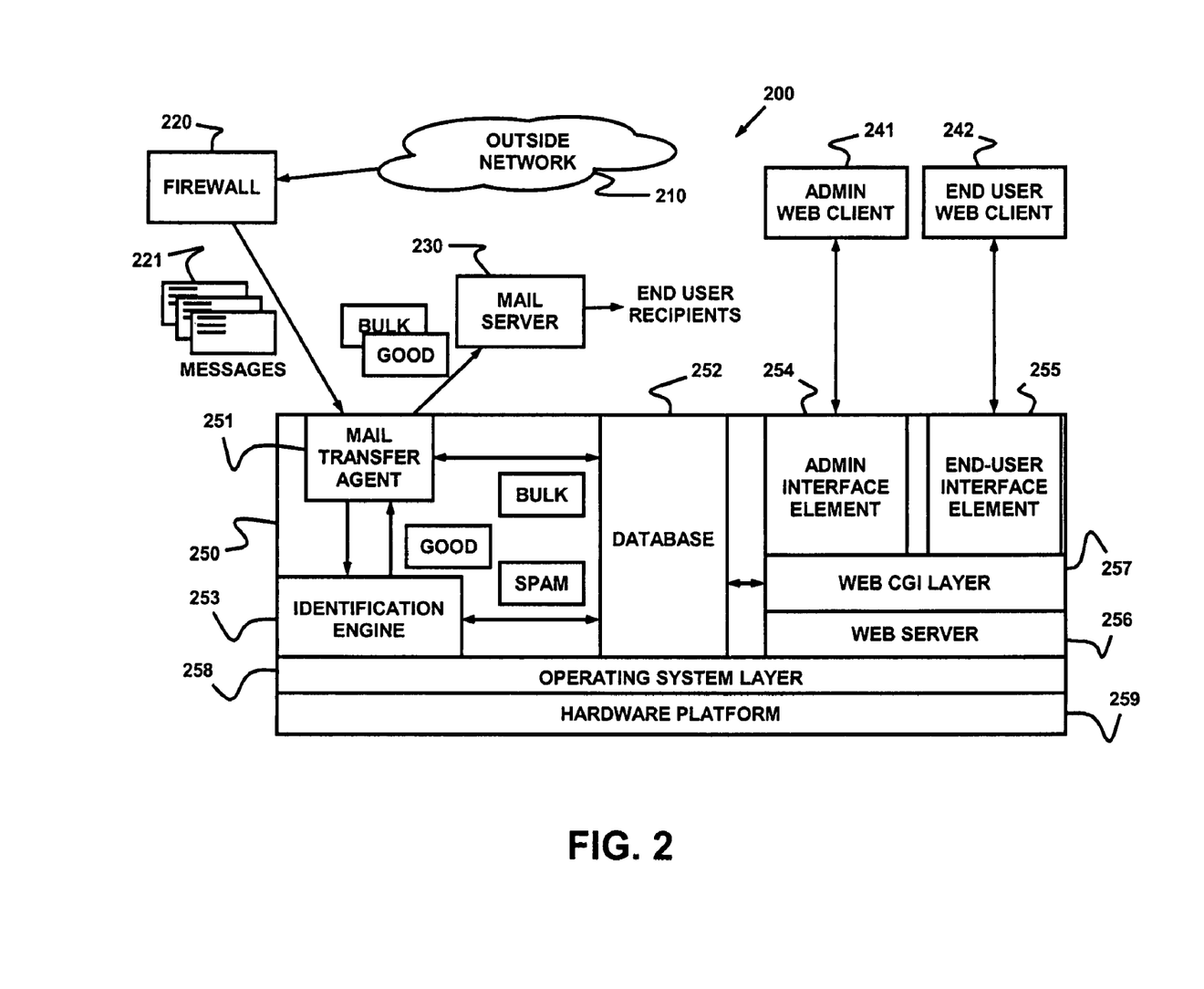
FIG. 2 shows a block diagram of a system for dynamic message filtering, in an embodiment disposed behind a firewall.

FIG. 2 shows a block diagram of a system for dynamic message filtering, in an embodiment disposed behind a firewall.

An embodiment of a system 200 includes an outside network 210 (similar to the outside network 110 of FIG. 1), a firewall 220 (similar to the firewall, router or gateway router described with regard to the appliance level 120 of FIG. 1), a mail server 230 (similar to the mail server 131 of FIG. 1), an administrator web client 241, an end-user web client 242, and a spam filter 250 (similar to the spam filter 121 of FIG. 1).

Similar to the outside network 110 of FIG. 1, the outside network 210 might include any technique for sending or receiving messages. In one embodiment, the outside network 210 includes an Internet, such as for example an ISP coupled to an Internet backbone network. However, in the context of the invention, there is no particular requirement that the outside network 210 involves any particular type of communication system. In alternative embodiments, the outside network 210 may include an intranet, extranet, VPN, an ATM network, a private or public switched network such as for example a PSTN, or some combination or conjunction thereof.

Similar to the firewall described with regard to the appliance level 120 of FIG. 1, the firewall 220 is capable of receiving mail traffic such as email and other messages 221 from the outside network 210, examining those messages 221 to determine if they should be blocked or not (in response to a set of firewall rules maintained by the firewall 220), and sending those messages 221 (if not blocked) to the spam filter 250.

Similar to the mail server 131 of FIG. 1, the mail server 230 is capable of receiving messages 221 from the spam filter 250 and forwarding those messages to end-user recipients in response to their contents. For some examples, not intended to be limiting in any way, the mail server 230 might include a known mail server using a known mail transfer protocol, such as for example IMAP, POP, or SMTP.

The administrator web client 241 includes a processor, program and data memory, and input and output devices, such as for example configured as a desktop workstation, a notebook computer, a "Blackberry" or "Palm Pilot" or other handheld computing device, or other device. The administrator web client 241 is capable of communicating with the spam filter 250, with the effect than an administrator is capable of reviewing, editing, or deleting configuration information maintained by the spam filter 250 for general use.

The end-user web client 242 includes a processor, program and data memory, and input and output devices, such as for example configured as a desktop workstation, a notebook computer, a "Blackberry" or "Palm Pilot" or other handheld computing device, or other device. The end-user web client 241 is capable of communicating with the spam filter 250, with the effect than an end-user is capable of reviewing, editing, or deleting configuration information maintained by the spam filter 250 for use involving that end-user.

Spam Filter

Similar to the spam filter 121 of FIG. 1, the spam filter 250 is capable of receiving the messages 221 allowed through by the firewall 220, examining those messages 221 to determine if they should be treated as good messages, bulk advertising, or spam, and taking one or more actions with regard to those messages 221 in response to a result of that determination. Those one or more actions might include (a) tagging the message 221 appropriately before forwarding it to the mail server 230 for delivery, (b) delaying, deleting, quarantining, or otherwise treating the message 221, (c) forwarding the message 221 to users or other entities besides the end-user to whom the message 221 was originally addressed, and (d) updating its own state with the effect that the spam filter 250 is better able to discern which messages 221 are good messages, bulk advertising, or spam.

In one embodiment, the spam filter 250 includes a mail transfer agent 251, a database 252, an identification engine 253, an administration interface element 254, an end-user interface element 255, a web server 256, a web CGI layer 257, an operating system layer 258, and a hardware platform 259.

In one embodiment, the mail transfer agent 251 includes a PostFix Mail Transfer Agent, such as for example a version 1.1.11 (available from IBM), modified to include capabilities and functions as described herein. The mail transfer agent 251 could also use or instead include Sendmail.

The mail transfer agent 251 is capable of transferring messages 221 among or between devices, using the general schema that user senders (using user agents) send messages 221 to the mail transfer agent 251, which sends the message 221 to one or more other mail transfer agents, each of which delivers the message 221 to one or more end-user recipients. In one embodiment, the mail transfer agent 251 is modified with the effect that it communicates with the database 252 and the identification engine 253 to examine and classify messages 221.

In one embodiment, the database is used to store user and administrative settings, as well as statistics and email logging and reporting. Messages that are identified as spam can also be stored in a file system for later retrieval if a user determines that the messages are not actually spam (that is, they were misidentified "false positives"). In alternative embodiments, messages that are identified as spam can also be stored in the database 252 for later retrieval under similar conditions.

In one embodiment, the identification engine 253 includes a Corvigo (proprietary) filtering engine, such as for example version 2.4 thereof. In this embodiment, the filtering engine uses a combination of artificial intelligence techniques, for example including natural language processing, to determine the intent of messages. Filtering can then be performed based on determined intent.

In one embodiment, the administration interface element 254 includes an interface. The administrator interface element allows an administrator to configure, run and maintain the spam filter 250. The administration interface element 254 might be built using known tools, such as for example HTML (hypertext markup language) and PHP.

In one embodiment, the end-user interface element 255 includes a user interface. The user interface element allows users to perform one or more of the following operations: modifying their spam filtering preferences, viewing a report of mail messages and how that mail was categorized and handled, and allowing the users to find and retrieve "false positives" (that is, good messages mistakenly identified as bulk periodicals or spam). The end-user interface element 255 might be built using known tools, such as for example HTML and PHP.

In one embodiment, the web server 256 includes an open-source server such as the Apache HTTP Server license 1.0. In this embodiment, the web server provides functions and interfaces used to generate a web CGI layer such as web CGI layer 257.

In one embodiment, the web CGI layer 257 includes a PHP (Hypertext Preprocessor) based interface that allows users and administrators to interact with spam filter 250 over an HTML-enabled network such as the World Wide Web.

In a first preferred embodiment, the hardware platform 259 and the operating system layer 258 include an Intel-architecture processor (or a functional equivalent thereof) operating under control of a version of the Linux operating system (or a similar operating system, such as a version of Unix or an operating system including the Mach microkernel). In a second preferred embodiment, the hardware platform 259 and the operating system layer 258 include a Sun SPARC station processor (or a functional equivalent thereof) operating under control of a version of the Solaris operating system (or a similar operating system, such as a version of Unix).

As described below, in one embodiment the mail transfer agent 251 at the spam filter 250 receives at least some of the messages 221 from the outside network 210, such as for example possibly using the firewall 220. The messages 221 are routed to the identification engine 253 for classification based on an intent of each message, as determined by that identification engine 253.

In one embodiment, the engine includes a regular expression recognizer and a set of artificial neural networks pre-trained to classify messages. The regular expression recognizer is suitable for detecting misspelled words, likely spam phrases composed of otherwise innocent words (such as for example "MAKE MONEY FAST"), and other common attempts by spammers to evade detection by known keywords that are typically indicative of spam. The artificial neural networks divide messages into "likely good" and "likely spam," and with that information, operate at a more detailed and discriminating level to distinguish among good messages, bulk periodicals, and spam.

Messages initially considered "likely good" might be ultimately identified as good messages or as bulk periodicals. Similarly, messages initially considered "likely spam" might be ultimately identified as bulk periodicals or as spam.

In one embodiment, messages identified as spam are sent to a file system for storage, in case they were misidentified (that is, they are "false positives"). In alternative embodiments, messages identified as spam may optionally be sent to the database 252 for later identification or other processing. Good messages and bulk periodicals, suitably marked, are sent from the mail transfer agent 251 to the mail server 230 for delivery to mailbox sections for end-user recipients.

Different ways of handling the various types of messages also are possible. For one example, not intended to be limiting in any way, the spam filter 250 could be configured to handle bulk messages as if they were spam.

System Elements (Configured as a Server)

After reading this application, those skilled in the art would recognize that the system for dynamic message filtering may alternatively be configured for use in an embodiment disposed as a server. In such embodiments, the server would be capable of generally similar to a combination of the mail server 131 and the spam filter 121 of FIG. 1. This would have the effect that the server would be capable of receiving messages, filtering out spam and possibly bulk periodical messages, and forwarding good messages to end-user recipients in response to their contents. In some embodiments, not intended to be limiting in any way, the server might function using a known mail transfer protocol, such as for example IMAP, POP, or SMTP.

Identification Engine

Figure 4:
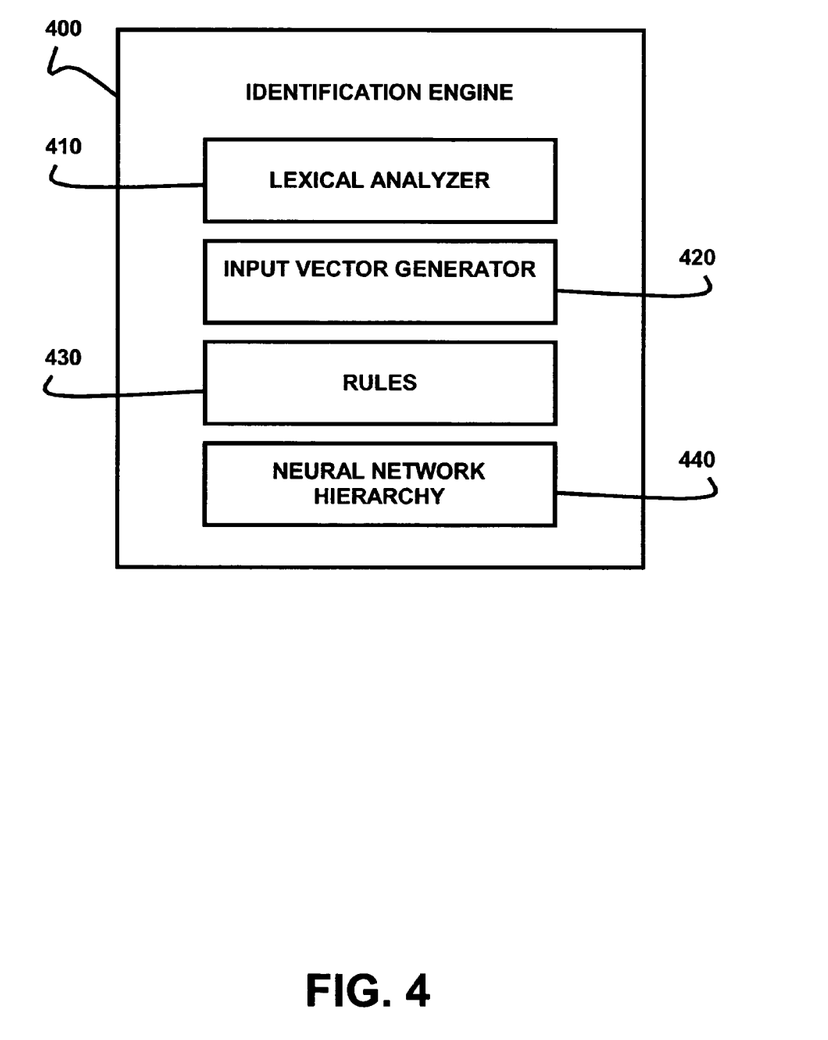
FIG. 4 shows a block diagram of one embodiment of an identification engine.

FIG. 4 shows a block diagram of one embodiment of an identification engine according to an aspect of the invention.

An embodiment of an identification engine 400, suitable for use as identification engines 250 or 350, includes a lexical analyzer 410, an input vector generator 420, rules 430, and a neural network hierarchy 440.

In one embodiment, the lexical analyzer 410 decodes and parses messages according to internet standards. The message is broken down into a header section and a body section. The header section is further decomposed into individual headers. The body section is decoded if necessary and stripped of extraneous markup. In this embodiment, multiple MIME parts and their subcomponents are handled.

In one embodiment, the input vector generator 420 includes a regular expression recognizer that uses the subject header and the text of the body to generate an input vector suitable for use by the hierarchy of neural networks 440. This is accomplished by using a many-to-one map of words and phrases to input vector positions. In one embodiment, the map includes a subset of the 2,000 most useful regular expressions (identifying words or phrases) pre-selected using a genetic algorithm out of the possibly 70,000 most common English words that might be used.

In one embodiment, the input vector generator 420 scans the textual characters of each message, and each word or phrase (up to four words long) that appears in the message is checked for a value in the map. If an entry corresponding to the word or phrase appears in the map, the appropriate value of the input vector is increased. Care is taken so that words are recognized in the message even if the message is composed in such a way as one might devise to circumvent the system.

In one embodiment, rules 430 apply basic rules to messages to possibly determine its classification in an efficient manner. One possible set of such rules are enumerated below. In this embodiment, once a classification has been positively determined by any rule, no further processing occurs.

(1) A message is classified if the sender of the message exists in a list of senders known to the recipient.

(2) A message is classified if the IP address of the client that sent the message exists in a list of IP addresses known by the administrator. The list contains the client IP address and the desired classification.

(3) A message is classified if the sender of the message exists in a list of senders known to the administrator. The list contains the sender's address and the desired classification.

(4) A message is classified if the domain part of the sender's address exists in a list of domains known to the administrator. The list contains the sender's address' domain and the desired classification.

(5) A message is classified as junk if the subject contains the string "adv" (or another selected string) followed by a delimiter. Such strings are sometimes used by advertisers to alert end users that the message is a commercial advertisement or other bulk email.

(6) A message may be classified if it uses a character set that is not commonly used for U.S. English messages (or another selected character set or language). The classification may occur in response to system configuration.

(7) A message is classified if its subject matches any search strings in a table containing regular expressions, search strings, and associated classifications in response thereto.

(8) A message is classified if its body matches any search strings in a table containing search strings and classifications.

(9) A message is classified if any of its headers match any search strings in a table containing search strings and classifications.

(10) A message is classified as junk if it contains code that would cause a mail reader to automatically create a new web browser window.

(11) A message is classified if the recipient's address does not appear in any of the standard message headers that contain lists of recipient addresses (such as for example "To" and "CC" headers). The classification may occur based on system configuration.

(12) A message may be classified as junk if the list of recipients as declared by the message's headers contain mostly addresses beginning with the same letter.

(13) If insufficient input has been generated by the input vector generator 420 for the message, it will be classified as a "good message."

In other embodiments, different rules 430 may be used, including some, all, or none of the foregoing examples.

With respect to the various lists used by the rules, in one embodiment these lists are divided into "whitelists" that include identifiers for good messages and "blacklists" that include identifiers for spam messages. Examples of identifiers include but are not limited to a sender's name, address, domain name, or IP address.

In one embodiment, the whitelists and blacklists can be dynamically maintained based on the classification of messages associated with those identifiers. For example, any sender for whom at least a threshold number (preferably four) of messages pass as good messages can be automatically added to the whitelist of known good senders, so that messages from those senders need not be checked as thoroughly as from other senders. Likewise, any sender for whom at least a threshold number (preferably four) of messages are rejected as spam can be automatically added to the blacklist of known spammers, so that messages from those senders need not be checked as thoroughly as from other senders. These classifications can come from the overall operation of the spam filter or spam filtering server, from user review of messages, or from some other source. Different thresholds and techniques for dynamically updating the lists also can be used.

Figure 3:
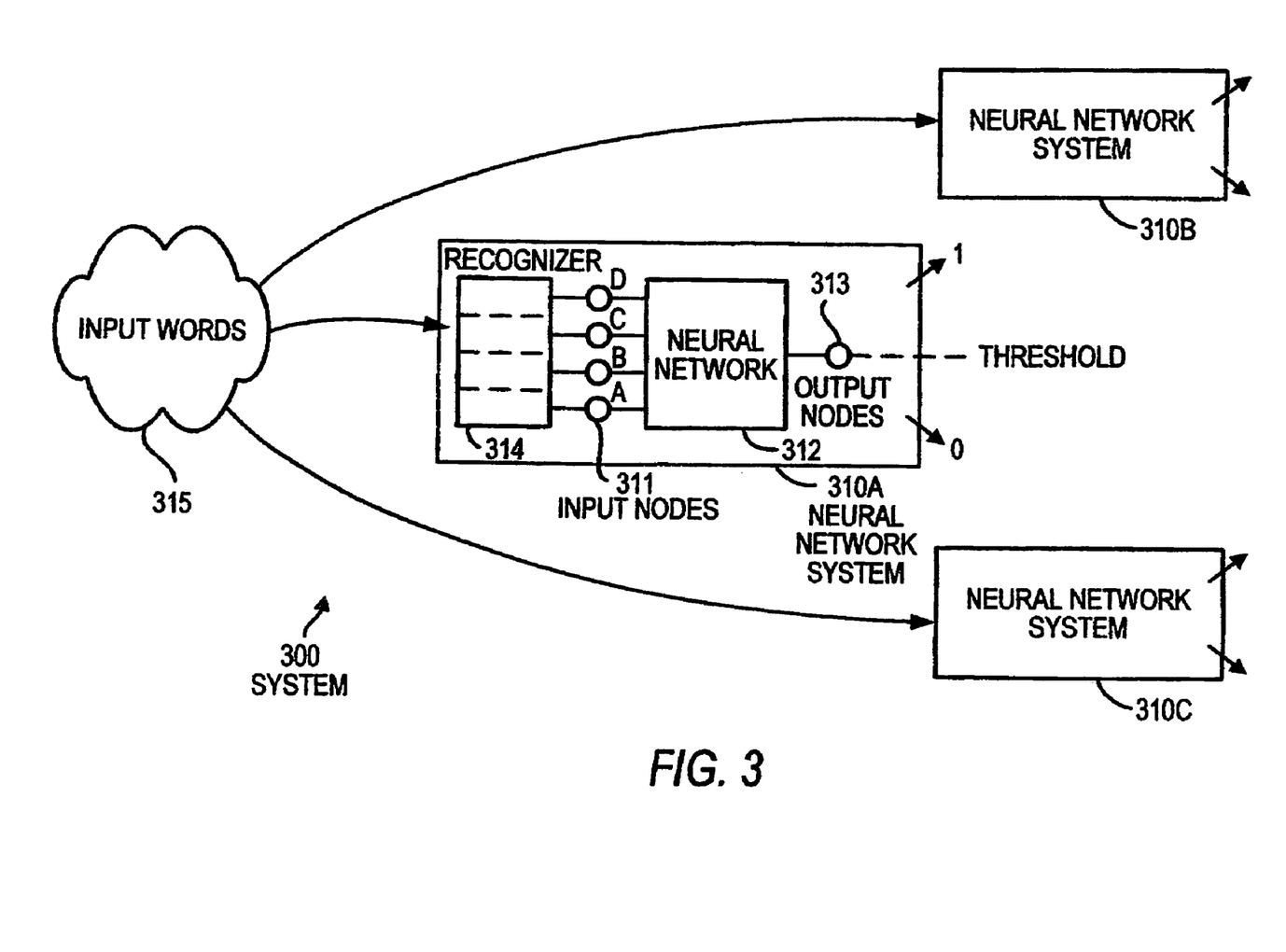
FIG. 3 shows a block diagram of one embodiment of a set of neural networks according to an aspect of the invention.

If none of the rules 430 positively classify the message, in one embodiment, the vector created by the input vector generator is processed by the hierarchy of neural networks 440, further described with regard to FIG. 3. The neural networks embody an artificial intelligence engine that filters the messages by looking at the intent of the messages as indicated by the generated input vector. One embodiment of the neural network hierarchy analyzes what words are used in a message, analyzes how those words are used both independently and in relationship with each other, and (c) considers a classification for the message based on this analysis and on knowledge of other messages.

One embodiment of hierarchy 440 includes at least two neural networks. The first neural network determines if a message is more likely legitimate or junk, dividing messages into "likely good" and "likely spam."

Based on the initial classification, a second neural network processes the input vector to determine if the message is bulk mail. In this embodiment, there are separate neural networks to classify bulk message from junk messages, and bulk messages from legitimate messages. Messages initially considered "likely good" might be ultimately identified as good messages or as bulk periodicals. Similarly, messages initially considered "likely spam" might be ultimately identified as bulk periodicals or as spam.

In alternative embodiments, the neural networks learn from messages that are processed in order to adapt to evolving anti-filtering strategies employed by senders of spam.

Different hierarchies with different numbers and purposes of neural networks can be used in other embodiments of the invention.

Neural Networks

FIG. 3 shows a block diagram of one embodiment of a set of neural networks according to an aspect of the invention.

A system 300 of neural networks 310A, 310B, and 310C includes at least a first neural network 310A, having a set of input nodes 311, a neural network body 312, and an output node 313. In one embodiment, each one of the input nodes 311 is coupled to a corresponding one regular expression recognizer 314.

A set of input words 315 from a message are coupled to the set of regular expression recognizers 314. Each one of the regular expression recognizers 314 generates, in response to the set of input words 315, a value (0 or 1) representing the absence or presence of an associated pattern, as represented by a regular expression. In one embodiment, the regular expression recognizers 314 are pre-selected. However, in alternative embodiments, the regular expression recognizers 314 may be altered in response to user feedback regarding whether a particular one or more messages are properly identified.

After reading this application, those skilled in the art would recognize that the regular expression recognizers 314 are not required to use regular expressions, or to provide discrete values of 0 or 1 in response to the set of input words 315. For a first example, not intended to be limiting in any way, the regular expression recognizers 314 might be replaced or assisted by other types of pattern matchers or machine learning techniques. For a second example, not intended to be limiting in any way, the regular expression recognizers 314 might use fuzzy logic or otherwise provide substantially continuous values (or one of a set of discrete values) between 0 and 1.

The set of outputs from the regular expression recognizers 314 is coupled to corresponding ones of the input nodes 311. Each one of the input nodes 311 is assigned a weighted value in response to a count of the number of regular expressions identified by the regular expression recognizers 314 and associated with that input node 311. This has the effect that, if a particular regular expression is identified twice, the input to that input node 311 will be in response to the value 2, rather than just 1 for identifying that particular regular expression once.

In one embodiment, each individual number of identified regular expressions is divided by the total number of identified regular expressions, with the effect that the values coupled to the input nodes 311 are substantially normalized to a total of 1. For one example, not intended to be limiting in any way, if there are 4 input nodes 311A, 311B, 311C, and 311D, and the number of identified regular expressions for each is 3, 3, 6, and 3 respectively (thus totaling 15), the normalized values will be 3/15, 3/15, 6/15, and 3/15 respectively (thus totaling 1.0).

In one embodiment, each substantially normalized value is adjusted to a minimal non-zero value, with the effect that the values coupled to the input nodes 311 are only zero if the pre-normalized number of identified regular expressions was exactly zero. In other cases, where the pre-normalized number of identified regular expressions was more than zero, but the normalized value was quite small (for example, 0.02), that normalized value is rounded up to a minimum quantum, preferably 0.1. In alternative embodiments, the same process might be conducted for maximum values as well.

The set of outputs from the input nodes 311 are coupled to a fully-connected neural network 312, with, in one embodiment, thresholds and weights preselected. However, in alternative embodiments, the thresholds or weights, or both, for the neural network 312 may be adjusted in response to user feedback.

The outputs from the fully-connected neural network 312 are coupled to an output node 313, with the effect that the output node 313 presents a value of between 0 and 1. A result of one of the neural networks 310A, 310B, or 310C, is responsive to a threshold value associated with that neural network 310A, 310B, or 310C, such as for example a preferred threshold value of 0.9. This has the effect that for the first neural network 310A, if the threshold value is exceeded, the message is re-evaluated by the second neural network 310B or if the threshold value is not exceeded, the message is reevaluated by the third neural network 310C. This also has the effect that for the second neural network 310B, if the threshold value is exceeded, the message is determined to be spam, or if the threshold value is not exceeded, the message is determined to be bulk email of possible interest. Similarly, this also has the effect that for the third neural network 310C, if the threshold value is exceeded, the message is determined to be bulk email of possible interest, or if the threshold value is not exceeded, the message is determined to be a "good message."

Method of Operation

Figure 5:
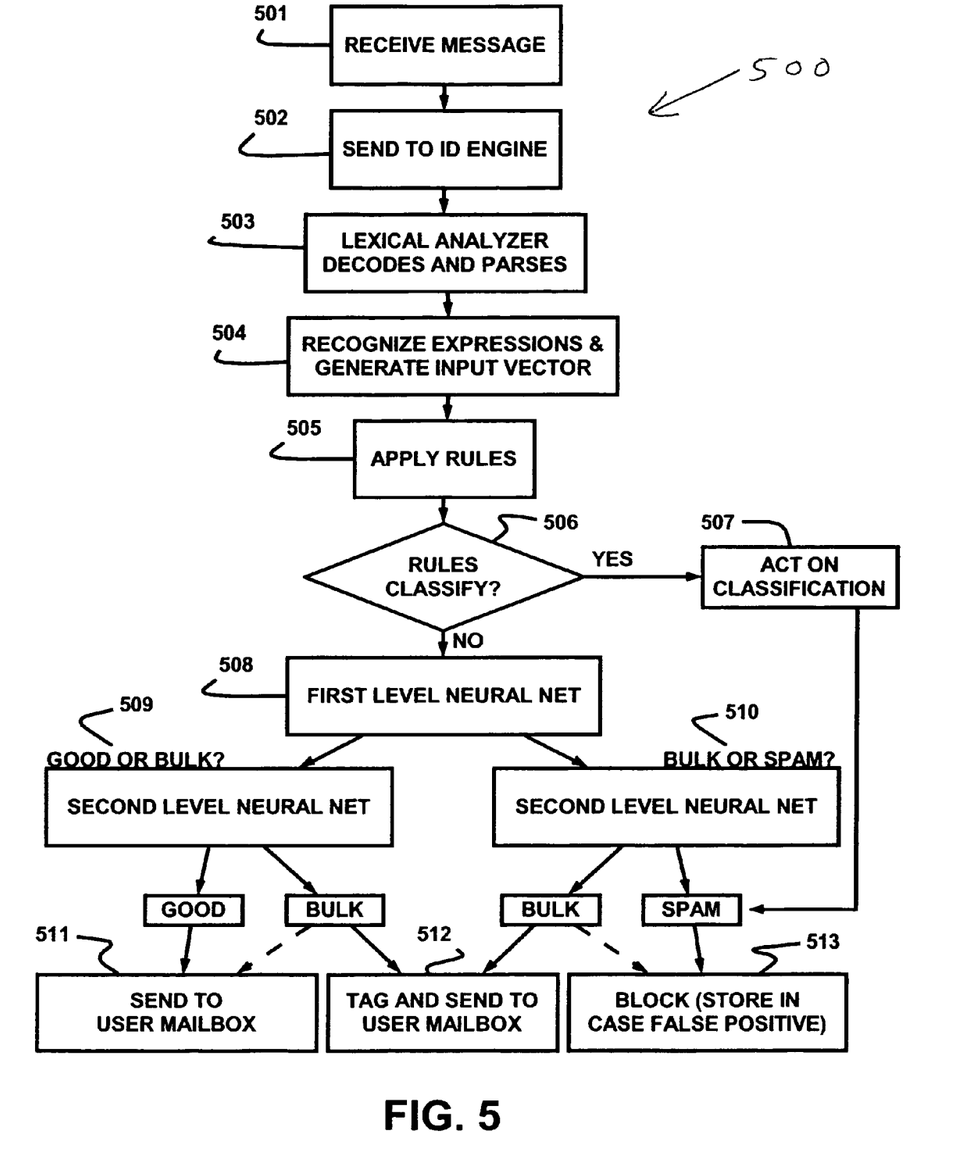
FIG. 5 shows a flow diagram of a method for dynamic message filtering.

FIG. 5 shows a flow diagram of a method for dynamic message filtering.

Although described serially, the flow points and method steps of the method 500 can be performed by separate elements in conjunction or in parallel, whether asynchronously or synchronously, in a pipelined manner, or otherwise. In the context of the invention, there is no particular requirement that the method must be performed in the same order in which this description lists flow points or method steps, except where explicitly so stated.

In a step 501, a message 321 is received.

In a step 502, the message 321 is sent to an identification engine, such as for example the identification engine 400 in FIG. 4.

In a step 503, a lexical analyzer such as for example the lexical analyzer 410 in FIG. 4 decodes and parses the message according to known standards, such as for example known Internet standards. The message is broken down into a header section and a body section. The header section is further decomposed into individual headers. The body section is decoded if necessary and stripped of extraneous markup. In one embodiment, multiple MIME parts and their subcomponents are handled.

In a step 504, an input vector generator, such as the input vector generator 420 in FIG. 4, recognizes words and expressions in the text of the header and body sections. The input vector generator uses the recognized words and expressions to generate an input vector. The vector is generated using a many-to-one map of words and phrases to input vector positions. In one embodiment, the map includes a subset of the 2,000 most useful regular expressions (identifying words or phrases) selected using a genetic algorithm out of the possibly 70,000 most common English words that might be used.

In one embodiment, the input vector generator scans the text of each message, and each word or phrase (up to four words long) that appears in the message is checked for a value in the map. If an entry corresponding to the word or phrase appears in the map, the appropriate value of the input vector is increased. Care is taken so that words are recognized in the message even if the message is composed in such a way as one might devise to circumvent the system.

In a step 505, rules such as for example rules 430 in FIG. 4 are applied to the message. In one embodiment, basic rules are applied to the message to possibly determine its classification in an efficient manner.

If the rules successfully classify the message, flow proceeds from step 506 to step 507. In step 507, the spam filter or spam filtering server acts upon the message based on the classification. One embodiment of possible classifications and actions is explained in more detail below with respect to steps 511 to 513.

If the rules do not successfully classify the message, flow proceeds from step 506 to step 508 to 510. In those steps, the message is analyzed by a hierarchy of neural networks such as hierarchy 440 in FIG. 4.

The neural networks filter the messages by looking at the intent of the messages as indicated by the input vector generated in step 504. One embodiment of the neural network hierarchy analyzes what words are used in a message, analyzes how those words are used both independently and in relationship with each other, and considers a classification for the message based on this analysis and on knowledge of other messages.

As further description, in step 508, a first level neural network determines if a message is more likely legitimate or junk. This step designates the message as "likely good," which can include both good and bulk messages, and "likely spam," which can include bulk and spam messages.

In a step 509, likely good messages are analyzed by a second level neural network to determine if they are good messages or bulk messages. Similarly, in a step 510, likely spam messages are analyzed by another second level neural network to determine if they are bulk messages or spam messages.

In one embodiment, the neural networks "learn" (that is, are adjusted using known techniques for neural network learning, such as for example back-propagation) from messages that are processed (and feedback from end-users in response thereto), with the effect that the neural networks adapt to evolving anti-filtering strategies that might be employed by senders of spam.

Good messages are handled at a step 511. These messages are sent to an end-user recipient or to a mailbox for the end-user recipient.

Bulk messages are handled at a step 512. In one embodiment, bulk messages are tagged, for example by modifying their subject header, and sent to an end-user recipient or to a mailbox for the end-user recipient. Alternatively, the spam filter or spam filtering server can be configured by an administrator or user to treat bulk messages as good messages or as spam messages. This is indicated by the dashed lines in FIG. 5.

Spam messages are handled at a step 513. In one embodiment, these messages are blocked (that is, not sent to an end-user). The messages can be stored, for example in a database, for later review and possibly retrieval in case of misidentification of bulk or good messages as spam. In one embodiment, any misidentification (that is, "false positives") are used to further adjust (as described above) the neural networks in order to help prevent similar misidentifications in the future.

In each of the steps 511, 512, and 513, the rules and the hierarchy of neural networks can be dynamically updated and maintained based on the results of the classification and the characteristics (e.g., text and generated input vector) for the message.

Different categories and actions can be used in different embodiments of the invention.

Alternative Embodiments

Although preferred embodiments are disclosed herein, many variations are possible which remain within the concept, scope, and spirit of the invention. These variations would become clear to those skilled in the art after perusal of this application.

Applications of the invention are not limited to embodiments in which only text messages, or messages that are primarily text, are examined. The invention includes embodiments in which other data types, including pictures (such as for example, still pictures or moving pictures) or sound (such as encoded sound), code fragments (such as HTML, DHTML, Java, JavaScript, and the like), and other elements of the message are considered when examining the message.

Applications of the invention are not limited to embodiments in which only the content of the headers or body of the message are examined. The invention includes embodiments in which other data about the message, including its time of sending or receipt, its size, its method or path of transmission (such as for example within the same enterprise or from a logically distant location), its protocol for transmission (such as for example POP, IMAP, or SMTP mail, or variants thereof), and whether that message includes attachments (and if so, their contents, size, or data type), are examined in addition to, or instead of, aspects described herein.

Applications of the invention are not limited to embodiments in which only email messages are examined. The invention includes embodiments in which other types of messages, including web pages or files received using other protocols (such as for example HTTP, HTTPS, FTP, or UDP) or messages of a completely different type (such as for example "instant messages," messages using peer-to-peer protocols, messages using HTTP tunneling, or application-specific messages such as "NeoMail" on www.neopets.com), are examined. For example, not intended to be limiting in any way, the invention might be configured to block web pages or portions thereof, such as for example (1) advertising embedded in web pages, (2) "pop-up" or "pop-under" web pages, or (3) web pages including content inappropriate for children, inappropriate for a specific location or workspace, offensive to a particular user, or simply unwanted by a particular user.

Applications of the invention are not limited to embodiments in which only human readable messages are examined. The invention includes embodiments in which other types of messages, including CRM or ERP system messages, or other forms of communication among and between multiple processors, are examined. For example, not intended to be limiting in any way, the invention includes embodiments in which bids or orders in an online auction or other transaction system are examined for error, falsity, spoofing, or other factors (such as for example, extreme market volatility).

Applications of the invention are not limited to embodiments in which messages are merely blocked or filtered. The invention includes embodiments in which other types of actions, including forwarding those messages, ranking them for priority, copying them to more permanent storage, dispatching them using wireless communication (or related technologies, such as for example sending a page or a telephone call). For example, the invention includes embodiments in which it is determined whether to forward an entire message or to omit any attachments, to a wireless recipient.

Other applications of the invention include use to automatically prioritize messages for forwarding to wireless devices or for secondary review, to determine which web pages to pre-load or cache, to detect malicious "pop-up" advertising or web page JavaScript, to detect unwanted "instant messages" and other message types, to automatically collect groups of messages into message digests, and to automatically detect outgoing messages for virus content.

Those skilled in the art will recognize, after perusal of this application, that these alternative embodiments are illustrative and in no way limiting.

The invention claimed is:

1. A method for blocking delivery of unwanted spam messages, comprising the steps of:
   recognizing patterns including words and groups of words in a messages;

applying a plurality of machine learning techniques including a two-level neural network responsive to the recognized patterns in order to classify the message, the two levels of neural networks include:
  a primary neural network level that determines if the message is likely a non-spam message or likely a spam message; and
  a secondary neural network level that includes a pair of neural networks including:
  a first secondary level neural network that determines if a likely non-spam message from the first neural network level is actually a non-spam message or a bulk message, and
  a second secondary level neural network, different from said first secondary level neural network, that determines if a likely spam message from the first neural network level is a spam message or a bulk message;
  for messages classified as bulk, providing user access to at least a listing of message subject field data corresponding to said bulk messages; and
  for messages classified as spam, blocking delivery of the messages to at least one intended recipient.

2. A method as in claim 1, wherein for at least one of the classifications the neural networks classify the message in one of three classifications, wherein more than one path through the neural networks exists for the message to arrive at that classification.

3. A method as in claim 1, further comprising the step of dynamically maintaining the neural networks responsive to classification of the message.

4. A method as in claim 1, further comprising the step of applying rules to the message to help classify the message.

5. A method as in claim 4, wherein if the message is classified by the rules, the step of applying the neural networks is skipped.

6. A method as in claim 4, wherein the rules utilize a whitelist, a blacklist, or both the whitelist and the blacklist.

7. A method as in claim 6, further comprising the step of dynamically maintaining the whitelist, the blacklist, or both the whitelist and the blacklist responsive to classification of the message.

8. A method as in claim 6, wherein the step of recognizing expressions further includes the step of applying a genetic algorithm to select a set of regular expressions to be recognized.

* * * * *

UNITED STATES PATENT AND TRADEMARK OFFICE
CERTIFICATE OF CORRECTION

PATENT NO. : 7,257,564 B2 Page 1 of 1
APPLICATION NO. : 10/678602
DATED : August 14, 2007
INVENTOR(S) : Scott Loughmiller et al.

It is certified that error appears in the above-identified patent and that said Letters Patent is hereby corrected as shown below:

In column 14, line 67, replace "messages" with --message--.

Signed and Sealed this

Twentieth Day of May, 2008

JON W. DUDAS
*Director of the United States Patent and Trademark Office*